US010099704B2

(12) United States Patent
Ohmae et al.

(10) Patent No.: US 10,099,704 B2
(45) Date of Patent: Oct. 16, 2018

(54) ELECTROMAGNETIC NOISE ANALYZING APPARATUS, CONTROLLING APPARATUS AND CONTROLLING METHOD

(71) Applicant: HITACHI, LTD., Chiyoda-ku, Tokyo (JP)

(72) Inventors: Aya Ohmae, Tokyo (JP); Hiroki Funato, Tokyo (JP); Keisuke Fukumasu, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/460,817

(22) Filed: Mar. 16, 2017

(65) Prior Publication Data
US 2018/0029606 A1    Feb. 1, 2018

(30) Foreign Application Priority Data
Jul. 28, 2016  (JP) ................. 2016-147968

(51) Int. Cl.
*B60W 50/04* (2006.01)
*G05B 17/02* (2006.01)

(52) U.S. Cl.
CPC ........... *B60W 50/045* (2013.01); *G05B 17/02* (2013.01); *B60W 2422/95* (2013.01)

(58) Field of Classification Search
CPC . B60W 50/045; B60W 2422/95; G05B 17/02; G06F 17/5036
See application file for complete search history.

(56) References Cited

U.S. PATENT DOCUMENTS

| 8,847,542 | B2* | 9/2014 | Osugi | ............ H02P 27/08 |
| | | | | 318/807 |
| 9,366,537 | B2* | 6/2016 | Bugno | ............ G01C 17/38 |
| 2010/0080399 | A1* | 4/2010 | Pfau | ............ B60H 1/00764 |
| | | | | 381/71.4 |
| 2014/0372092 | A1* | 12/2014 | Funato | ............ G06F 17/5009 |
| | | | | 703/2 |

FOREIGN PATENT DOCUMENTS

JP    2013-030186 A    2/2013

* cited by examiner

*Primary Examiner* — Michael J Zanelli
(74) *Attorney, Agent, or Firm* — Miles & Stockbridge, P.C.

(57) ABSTRACT

Provided is an electromagnetic noise analyzing apparatus, a controlling apparatus, and a controlling method in each of which the continuous change of the running state of a vehicle or a railway vehicle is considered. The controlling apparatus includes: a vehicle running control section which outputs, on the basis of operation information of a vehicle, a vehicle driving parameter as a driving state of the vehicle; a signal converting section which converts the vehicle driving parameter into a noise parameter as an electric parameter; and an electromagnetic noise analyzing section which calculates, on the basis of the noise parameter, the amount of electromagnetic noise propagating in the vehicle.

12 Claims, 12 Drawing Sheets

ELECTROMAGNETIC NOISE ANALYZING APPARATUS, CONTROLLING APPARATUS AND CONTROLLING METHOD

INCORPORATION BY REFERENCE

The present application claims priority from Japanese application JP 2016-147968 filed on Jul. 28, 2016, the content of which is hereby incorporated by reference into this application.

BACKGROUND OF THE INVENTION

(1) Field of the Invention

The present invention relates to an electromagnetic noise analyzing apparatus, a controlling apparatus, and a controlling method.

(2) Description of Related Art

As a background art in this technical field, there is a technique disclosed in JP-A-2013-30186. The abstract in this publication describes that "in a noise analysis design method of an electric apparatus such as an automobile inverter, the electric apparatus includes one or more energy sources; a propagation path through which energy from each of the energy sources propagates; and a noise source area where electromagnetic radiation noise is generated by the energy transmitted through the propagation path, wherein the noise analysis design method includes a step of estimating generated noise such as generated radiation noise by analyzing a path specified by a user using a computer, and the path specified by the user is the path of energy flowing through the propagation path."

BRIEF SUMMARY OF THE INVENTION

In power electronic apparatuses used in railroad vehicles, vehicles and the like in recent years, SiC (silicon carbide) power devices have being applied. The SiC power device is desired to have improved efficiency and smaller size as compared with the Si (silicon) device.

On the other hand, the SiC power device has a disadvantage that, under high speed and high frequency switching operation, electromagnetic noise is increased so that the probability of equipment malfunction tends to be increased. For improving safety and reliability, it is necessary to estimate, that is, analyze the amount of electromagnetic noise during actual operation of the apparatuses, and to thereby control the operation of the apparatuses based on the amount of electromagnetic noise.

In JP-A-2013-30186 described above, a noise analyzing method, as a method of analyzing system-level noise in vehicles and railroad vehicles, is realized in such a manner that electromagnetic noise models of components configuring a system and of a housing are created and connected to each other as the system. In JP-A-2013-30186, the electromagnetic noise analysis of each of the models is performed by reflecting the predetermined operation mode as shown in the dotted lines in FIG. 4.

Figure 4:
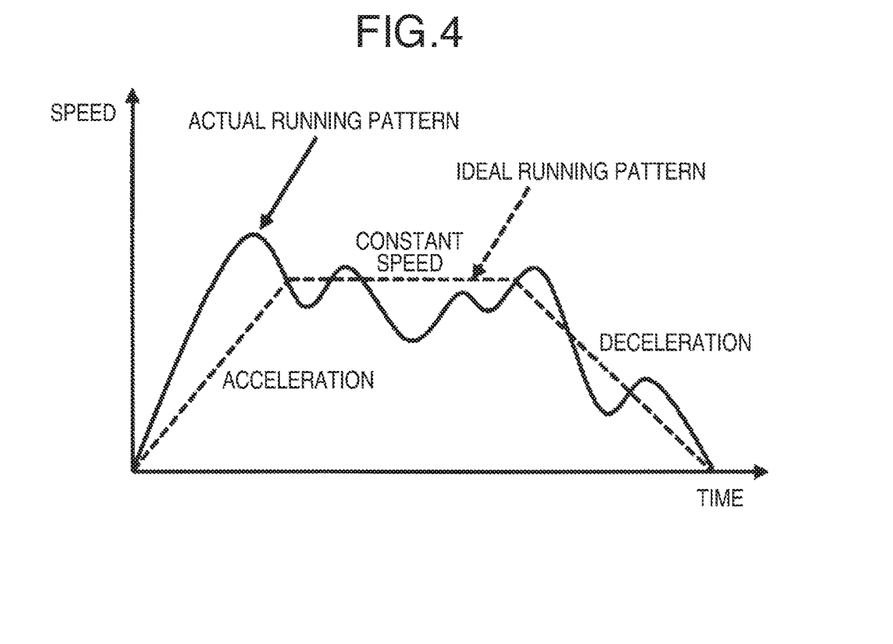
FIG. 4 is an example of a running pattern of a vehicle.

However, in the actual operation of vehicles and railroad vehicles, the running state does not change in the constant operation mode as shown by the solid lines in FIG. 4, but the running state changes continuously. For this reason, in the conventional technique, the actual running state is not taken into consideration, and hence, it is difficult to comprehensively predict electromagnetic noise that can occur when the vehicle is actually running.

Therefore, the present invention provides an electromagnetic noise analyzing apparatus, a controlling apparatus, and a controlling method in each of which the continuous change of the actual running state of a vehicle or a railway vehicle is considered.

In order to solve the above-described problem, for example, the following configurations described in the claims are adopted. This application includes a plurality of means to solve the above-described problem. An example of the plurality of means is a controlling apparatus including: a vehicle running control section which outputs a vehicle driving parameter as a driving state of a vehicle on the basis of operation information of the vehicle; a signal converting section which converts the vehicle driving parameter into a noise parameter as an electric parameter; and an electromagnetic noise analyzing section which calculates, on the basis of the noise parameter, the amount of electromagnetic noise propagating in the vehicle.

According to the present invention, it is possible to provide an electromagnetic noise analyzing apparatus, a controlling apparatus, and a controlling method in each of which the continuous change of the running state of a vehicle or a railway vehicle is considered. Further, issues other than those described above, configurations and effects will be apparent from the following description of embodiments. Other objects, features and advantages of the invention will become apparent from the following description of the embodiment of the invention taken in conjunction with the accompanying drawings.

DETAILED DESCRIPTION OF THE INVENTION

In the following, embodiments will be described with reference to drawings.

Embodiment 1

In the present embodiment, there is described an example of a controlling apparatus which controls the drive of a vehicle according to a change of the amount of electromagnetic noise.

Figure 1:
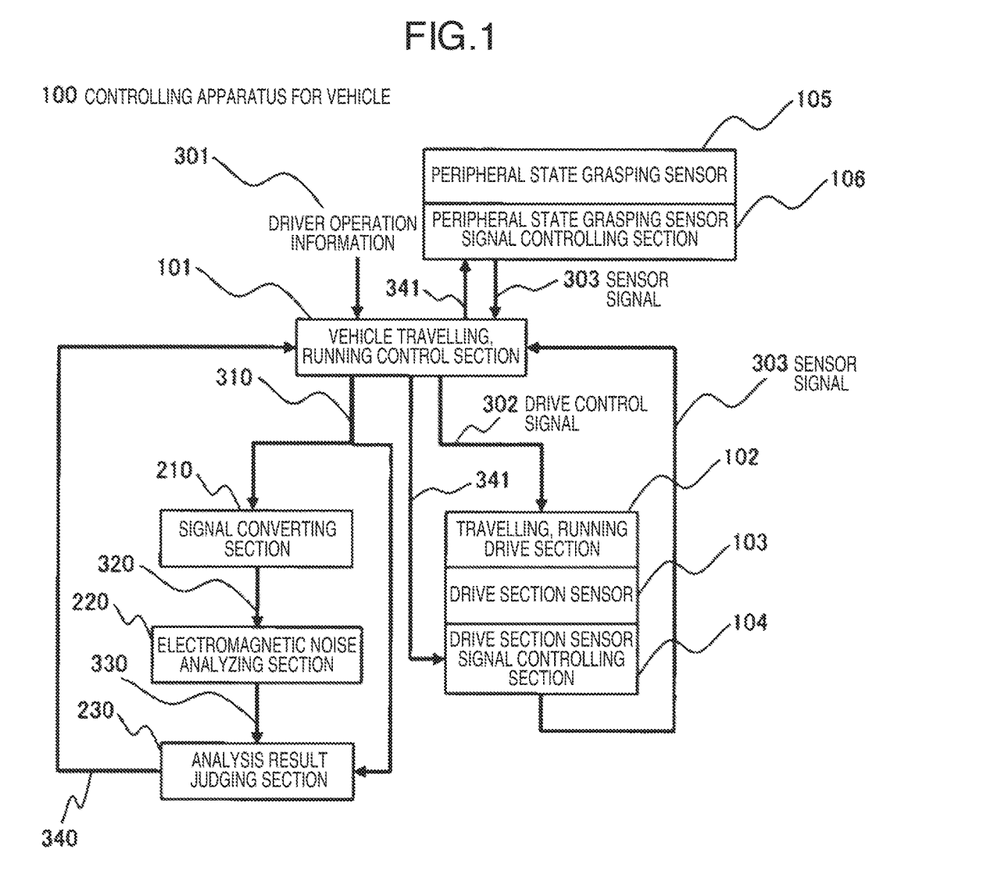
FIG. 1 shows one example of a configuration of a controlling apparatus in embodiment 1.

FIG. 1 shows an example of a configuration of a controlling apparatus in the present embodiment.

A controlling apparatus 100 includes a vehicle travelling, or running, control section 101, a travelling, or running, drive section 102, a drive section sensor 103, a drive section sensor signal controlling section 104, a peripheral state grasping sensor 105, a peripheral state grasping sensor signal controlling section 106, a signal converting section 210, an electromagnetic noise analyzing section 220, and an analysis result determining, or judging, section 230.

The vehicle running control section 101 outputs: a driving control signal 302 for driving a vehicle on the basis of driver operation information 301 as operation signals from operating apparatuses (not shown), such as a handle and an accelerator of the vehicle, and on the basis of vehicle operation information, such as sensor signals 303 from the peripheral state grasping sensor signal controlling section 106 and the drive section sensor 103; and vehicle driving parameters 310, such as vehicle speed as a physical quantity showing the driving state of the vehicle driven with the driving control signal 302, and the torque, the number of rotations, the rotational speed and the like of the motor. The driving control signals 302 are, for example, a signal for controlling the output frequency of an inverter, a signal for making the inverter control the number of rotations of the motor and drive, and the like.

It should be noted that an actual running pattern may also be directly inputted into the vehicle running control section 101 so that the driving control signal 302 is outputted on the basis of the actual running pattern. Here, as shown in FIG. 4, the actual running pattern means an actual running pattern of the vehicle with respect to time when the vehicle is accelerated or decelerated or runs at constant speed under driver operation or automatic operation.

In the signal converting section 210, the vehicle driving parameters 310, as the physical parameters showing the driving state of the vehicle, are converted into noise parameters 320 as electric parameters, such as voltage, current, frequency, impedance, and transfer function, which are related to electromagnetic noise. The details of the signal converting section 210 will be described below together with the electromagnetic noise analyzing section 220.

It should be noted that examples of the noise parameters are the voltage applied to the inverter, the current flowing into the inverter, the frequency of the voltage and current outputted from the inverter, and the impedance of the inverter. That is, the noise parameters may be the applied voltage, the flowing current, the frequency of the output voltage and current and the like, of each of the components configuring the vehicles.

The running drive section 102 receives the input of the driving control signal 302 from the vehicle running control section 101, and drives running of the vehicle. The running drive section 102 is, for example, the inverter, or the motor.

The drive section sensor 103 detects the driving states of the running drive section 102. The driving states of the running drive section 102 are, for example, the value of current flowing through the inverter and the frequency outputted from the inverter.

The drive section sensor signal controlling section 104 converts a value detected by the drive section sensor 103 into a signal, and outputs the signal to the vehicle running control section 101.

The peripheral state grasping sensor 105 detects and grasps the states in the periphery of the vehicles. The peripheral state grasping sensor 105 is, for example, a white line detection camera or a periphery monitoring camera. The peripheral state grasping sensor signal controlling section 106 converts the state detected by the peripheral state grasping sensor into a signal, and outputs the signal to the vehicle running control section 101.

The electromagnetic noise analyzing section 220 receives the noise parameters 320 and analyzes, for example, electromagnetic noise of the whole vehicle, and outputs the analysis result to the analysis result determining section 230. Here, the analysis result includes analysis results about the amount of electromagnetic noise, such as the relationship between each of frequency components of the electromagnetic noise at certain times and the intensity of each of the frequency components, and the relationship between the time with respect to each of the frequency components and the intensity of the electromagnetic noise.

The analysis result determining section 230 determines the analysis result on the basis of a predetermined threshold value of the amount of noise. When the amount of electromagnetic noise of the analysis result exceeds the threshold value, the analysis result determining section 230 mutually associates the vehicle driving parameters 310 and the electromagnetic noise determination result 340 at the time when the threshold value is exceeded, and then outputs the electromagnetic noise determination result 340 to the vehicle running control section 101.

On the basis of the electromagnetic noise determination result 340 and the vehicle driving parameter 310 exceeding the threshold value, the vehicle running control section 101 changes the driving control signal 302 so as to reduce the electromagnetic noise, and then controls the running drive section 102. For example, by reducing the intensity of the voltage and current of the frequency outputted from the inverter, the vehicle running control section 101 can reduce the amount of electromagnetic noise in the vehicle driving parameter 310 at which the amount of electromagnetic noise exceeding the threshold value is generated.

It should be noted that the vehicle driving parameter 310, at which the amount of electromagnetic noise exceeding the threshold value, may be also stored, as electromagnetic noise information 341, in a storage section (not shown). Further, when outputting the vehicles driving parameter 310 stored in the storage section, the vehicle running control section 101 performs matching comparison with the vehicle driving parameter 310 stored in the storage section. When the matching is obtained, the vehicle running control section 101 may output the driving control signal 302 for reducing the amount of electromagnetic noise without output from the analysis result determining section 230. Thereby, once influential electromagnetic noise is received, the amount of electromagnetic noise can be reduced in advance without performing the electromagnetic noise analysis.

Further, the vehicle running control section 101 may output the electromagnetic noise information 341 to the drive section sensor signal controlling section 104 and the peripheral state grasping sensor signal controlling section 106 so that the communication method of the sensor signal 303 and 304 may be changed to be a communication method which is strong against the noise. Specifically, for example, a communication method, which has lower communication speed but is provided with the error correction processing, may be applied. Further, in the drive section sensor signal controlling section 104 and the peripheral state grasping sensor signal controlling section 106, on the basis of the electromagnetic noise information 341, the electromagnetic noise from the sensor information of the drive section sensor 103 and the peripheral state grasping sensor 105 may be reduced so as to reduce the influence of noise to the sensor information itself. Thereby, stable communication can be realized.

Next, the details of the signal converting section 210 and the electromagnetic noise analyzing section 220 will be described.

Figure 2:
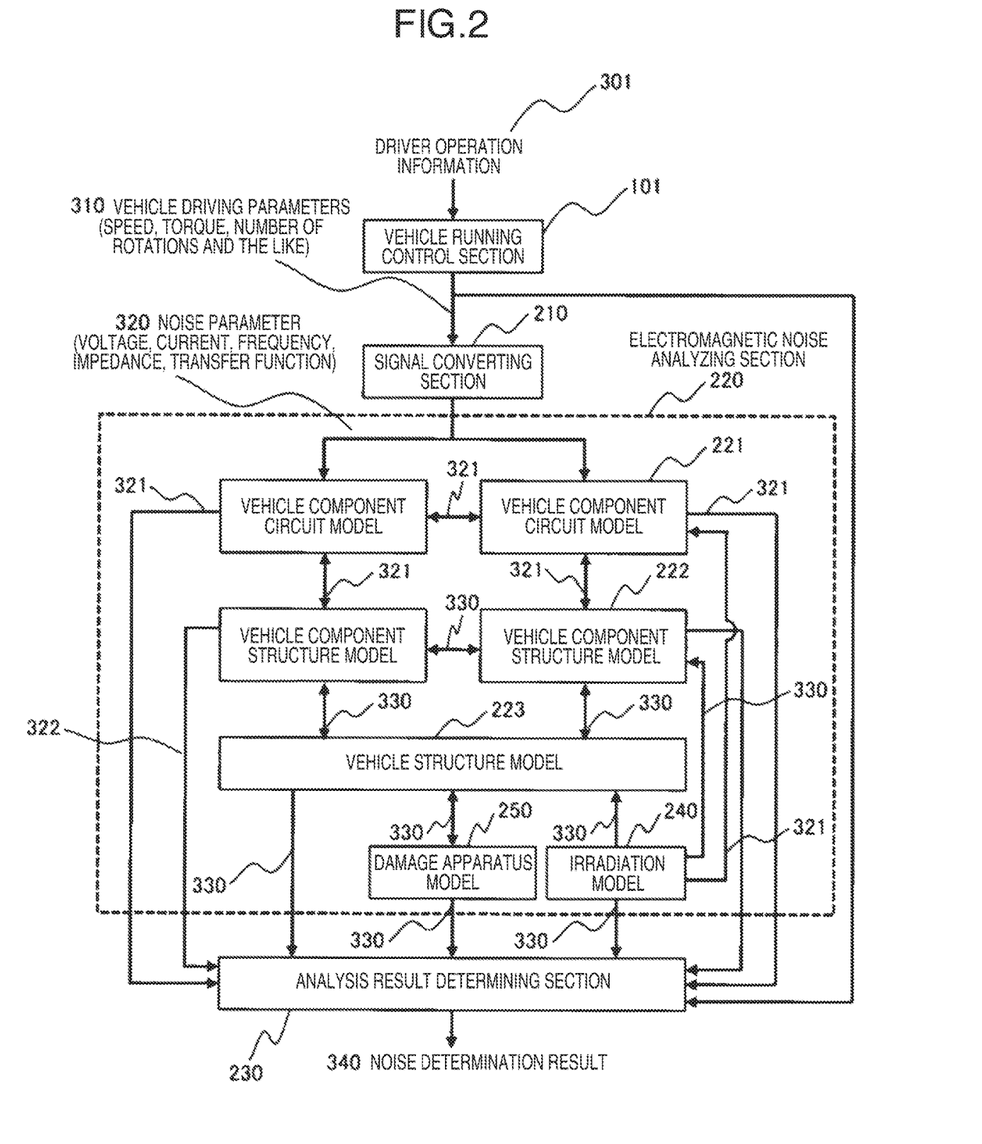
FIG. 2 is one example of a configuration of an electromagnetic noise analyzing section of the controlling apparatus in embodiment 1.

FIG. 2 is an example of a configuration of the electromagnetic noise analyzing section of the controlling apparatus in embodiment 1. The electromagnetic noise analyzing section 220 is configured by being divided into component elements which are a vehicle component circuit model 221, a vehicle component structure model 222, a vehicles structure model 223, a damage apparatus model 250, and an irradiation model 240. In the analysis of electromagnetic noise, each of these models can be replaced by each of the components and is connected to each of the other component models by a following input/output port.

For example, the vehicle component circuit model 221 is an equivalent circuit model in which each of the components, such as the inverter and the motor in the vehicles is expressed by an equivalent circuit. The vehicle component circuit model 221 has an input port of the noise parameter 320 and an input/output port of current/voltage 321. The vehicle component circuit model 221, whose input/output port is connected to the input/output port of each of the other vehicle component circuit model 221 and the vehicle component structure model 222, performs input/output of information between itself and the other models.

For example, the input/output of the noise parameter 320 is performed between the signal converting section 210 and each of the vehicle component circuit models 221 via the input/output ports of the signal converting section 210 and each of the vehicle component circuit model 221. The input/output of the information on the current/voltage 321 is performed between the vehicle component circuit models 221, between the vehicle component circuit model 221 and the vehicles component structure model 222, and between the vehicle component circuit model 221 and the irradiation model 240 via the input/output port of the respective models. Further, the current/voltage 321 are outputted to the analysis result determining section 230.

Figure 7:
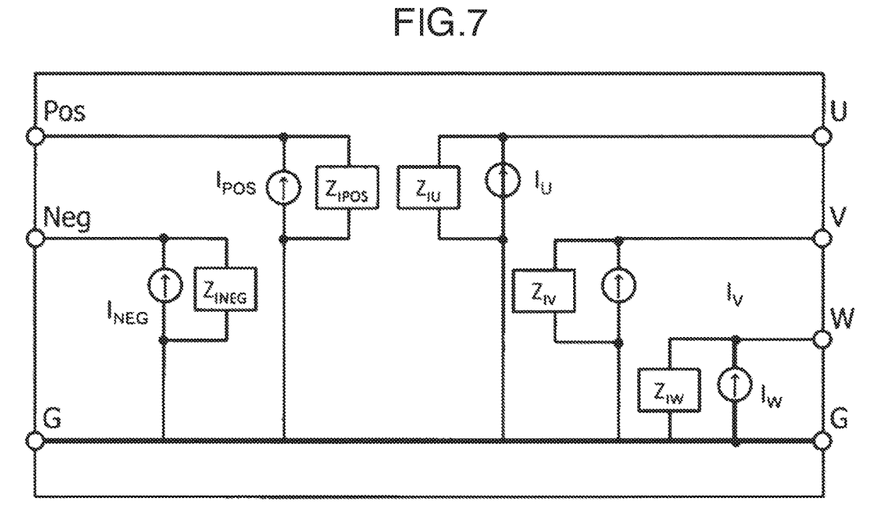
FIG. 7 is an example of a vehicle component circuit model in embodiment 1.

For example, when the vehicle component is the inverter, the voltage applied to the inverter and the current flowing into the inverter are inputted from the input/output ports (Pos, Neg, G of FIG. 7) of the equivalent circuit (see FIG. 7). Further, the current/voltage calculated in the equivalent circuit are inputted into, for example, the input/output ports of the equivalent circuit of wirings from the input/output ports (U, V, W, G of FIG. 7). Further, these calculated voltage/current are inputted into the structure model of the inverter via the input/output ports. In this way, it can be considered that the equivalent circuit of one of the components is paired with the structure model of the component via the input/output ports.

The vehicle component structure model 222 is, for example, an electromagnetic field analyzing model having a physical structure of components of the inverter, the motor and the like in the vehicle. The vehicle component structure model 222 has input/output ports of the current/voltage 321 and current/voltage/electromagnetic wave 330. The input/output ports are connected to the input/output ports of the other vehicle component structure models 222 and the like, and thereby performs input and output of information.

For example, the input/output of the current/voltage 321 is performed between the vehicle component circuit model 221 and the vehicle component structure model 222 via each set of the input/output ports. Also, the input/output of information of the current/voltage/electromagnetic wave 330 is performed between the vehicle component structure models 222, between the vehicle component structure model 222 and the vehicle structure model 223, and between the vehicle component structure model 222 and the irradiation model 240 via each set of the input/output ports. Further, the current/voltage/electromagnetic wave 330 are outputted to the analysis result determining section 230.

It should be noted that, although the number of each of the vehicle component circuit model 221 and the vehicle component structure models 222 in FIG. 2 is two, the number is not limited to this and may be three or more. In the following, the number of each of the models is not limited to the shown number.

The vehicle structure model 223 is, for example, an electromagnetic field analyzing model having a physical structure of the vehicle itself. The vehicle structure model 223 has input/output ports of the current/voltage/electromagnetic wave 330, and performs the input/output of information by connecting these input/output ports to the input/output ports of the vehicle component structure model.

For example, the input/output of information of the current/voltage/electromagnetic wave 330 are performed between the vehicle component structure model 222 and the vehicle structure model 223, between the vehicle structure model 223 and the damage apparatus model 250, and between the vehicle structure model 223 and the irradiation model 240. The current/voltage/electromagnetic wave 330 are outputted to the analysis result determining section 230.

The damage apparatus model 250 is, for example, an electromagnetic field analyzing model having a physical structure of apparatuses, such as the peripheral state grasping sensor 105 and the drive section sensor 103, in the vehicle. The damage apparatus model 250 may be a single electromagnetic field analyzing model, or may also include circuit models, such as an equivalent circuit and an S-parameter. The damage apparatus model 250 has input/output ports of the current/voltage/electromagnetic wave 330, and performs the input/output of information of the current/voltage/electromagnetic wave 330, for example, between itself and the vehicle structure model 223, to output the current/voltage/electromagnetic wave 330 to the analysis result determining section 230.

The irradiation model 240 is an electromagnetic field analyzing model which has a physical structure such as, for example, an antenna or a current probe for application existing in the electromagnetic field analytic space, and irradiates electromagnetic waves. The irradiation model 240 may be a single electromagnetic field analyzing model or may be a circuit model, such as an equivalent circuit and an S-parameter. Further, the irradiation model 240 can also be expressed as plane waves in the surface in the electromagnetic field analytic space. The irradiation model 240 has ports of the current/voltage 321 or the current/voltage/electromagnetic wave 330, and the ports are respectively connected to the models as described above. The irradiation model 240 outputs the current/voltage/electromagnetic wave 330 to the analysis result determining section 230.

The analysis result determining section 230 determines whether or not the values of the current/voltage 321 or the current/voltage/electromagnetic wave 330 outputted from each of the models exceed predetermined threshold values. When the values of the current/voltage 321 or the current/voltage/electromagnetic wave 330 exceed predetermined threshold values, the analysis result determining section 230 outputs the values to the vehicle running control section 101 together with the driver operation information 301.

It is desirable that the threshold values are set to values obtained by multiplying, by a safety factor, values considered to cause electromagnetic interference. Further, even when the values do not exceed the threshold values, for example, the analysis result determining section 230 may monitor the integration value of each of the values of the current/voltage/electromagnetic waves 330 outputted from the electromagnetic noise analyzing section 220, and thereby detect an indication that the values exceed the threshold values. Thereby, before influence of electromagnetic noise is caused, the electromagnetic interference can be prevented.

Figure 3:
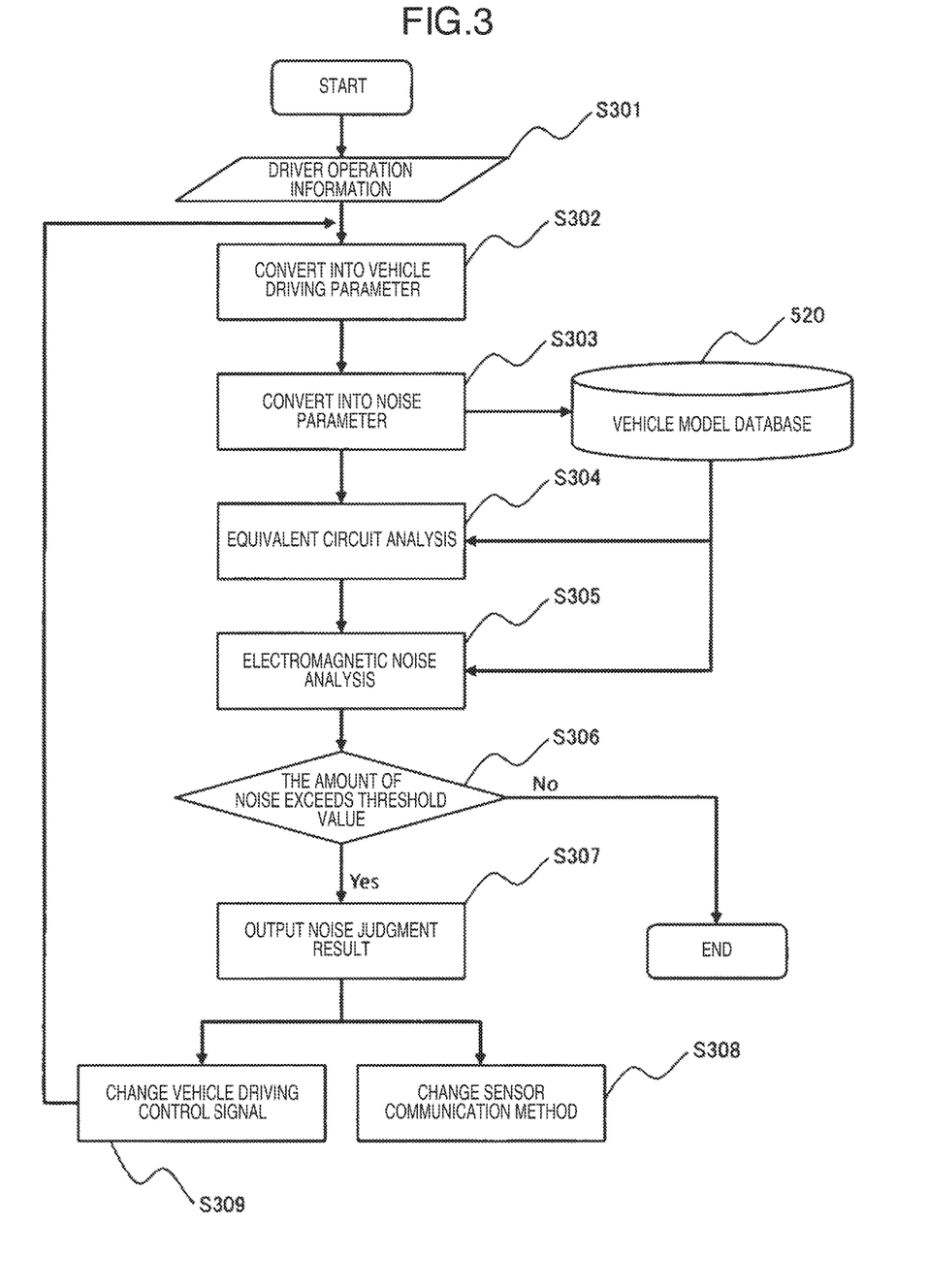
FIG. 3 is one example of a flowchart of the controlling apparatus in embodiment 1.

Next, a flow of the control in the present embodiment will be described with reference to FIG. 3. FIG. 3 is an example of a flowchart of the controlling apparatus in embodiment 1. The control is started, for example, while the vehicle is operated.

The driver operation information S301 inputted into the vehicle running control section is converted into vehicle driving parameters (S302), and then converted into noise parameters by the signal converting section 210 (S303). At this time, actual running patterns may be used instead of the driver operation information S301. Thereby, it is possible to perform the electromagnetic noise analysis simulating the actual running patterns.

The converted noise parameters are inputted into the vehicle component circuit model 221 stored in a vehicle model database 520. On the basis of the noise parameters, the vehicle component circuit model is driven, and the equivalent circuit analysis is performed (S304). The current/voltage required in the equivalent circuit analysis are inputted into the vehicle component structure model 222 and the vehicle structure model 223 which are stored in the vehicle model database, and thereby, the electromagnetic noise analysis is performed (S305).

As a result of the electromagnetic noise analysis, when the amount of electromagnetic noise exceeds the predetermined threshold value (S306), the noise determination result is outputted (S307), and the vehicle driving control signal is changed (S309). Also, the sensor communication method is changed (S308), and the electromagnetic noise analysis is again performed on the basis of the changed vehicle driving control signal. On the other hand, when the amount of electromagnetic noise does not exceed the threshold value (S306), a series of controls are ended. Then, when the vehicle is still operated, the series of controls are again started. It should be noted that, needless to say, when the vehicle is operating, the controls may not be ended, and the flow of the controls, as they are, may be repeated on the basis of the present driver operation information 301.

Figure 5:
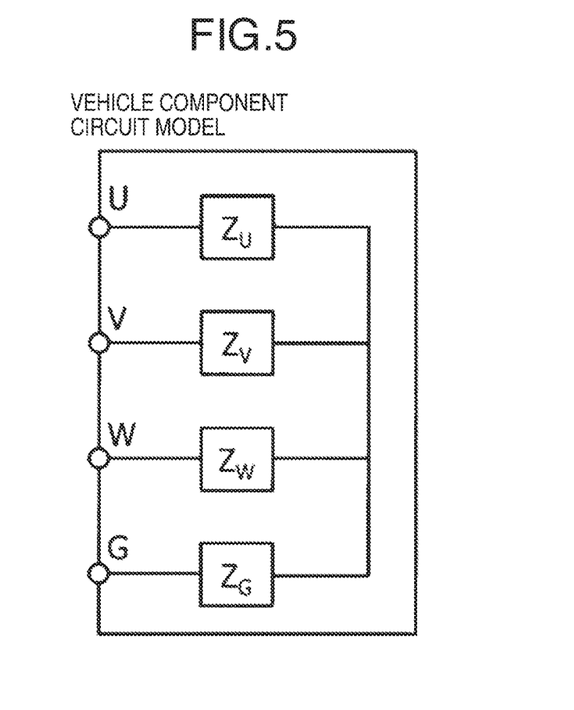
FIG. 5 is an example of a vehicle component circuit model in embodiment 1.
Figure 6:
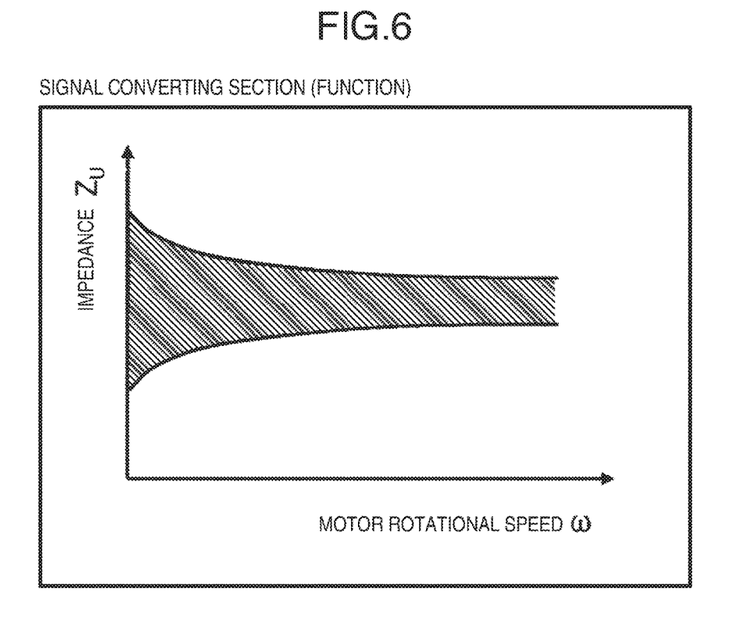
FIG. 6 is an example of a signal converting section in embodiment 1.

Next, the vehicle component circuit model 221 and the signal converting section 210 will be described by using the motor of the vehicles as an example. As shown in FIG. 5, the vehicle component circuit model 221 is expressed, for example, by impedances $Z_u$, $Z_v$, $Z_w$ of respective phases of a three-phase motor, and a grounding impedance $Z_g$. As shown in FIG. 6, the impedance of each of the phases is changed in time by, for example, the rotational speed ω of the motor. FIG. 6 shows the impedance $Z_u$, of U phase. In the signal converting section 210, the impedance Z is provided as a function of the rotational speed ω, and the impedance Z is outputted according to the rotational speed w changing in time. The outputted Z is imputed into the impedance of each of the phases in FIG. 5.

It should be noted that the rotational speed of the motor is one of the vehicle driving parameters which are outputted by inputting the actual running patterns of the vehicle, the operation information and the like into the vehicle running control section 101.

Figure 8:
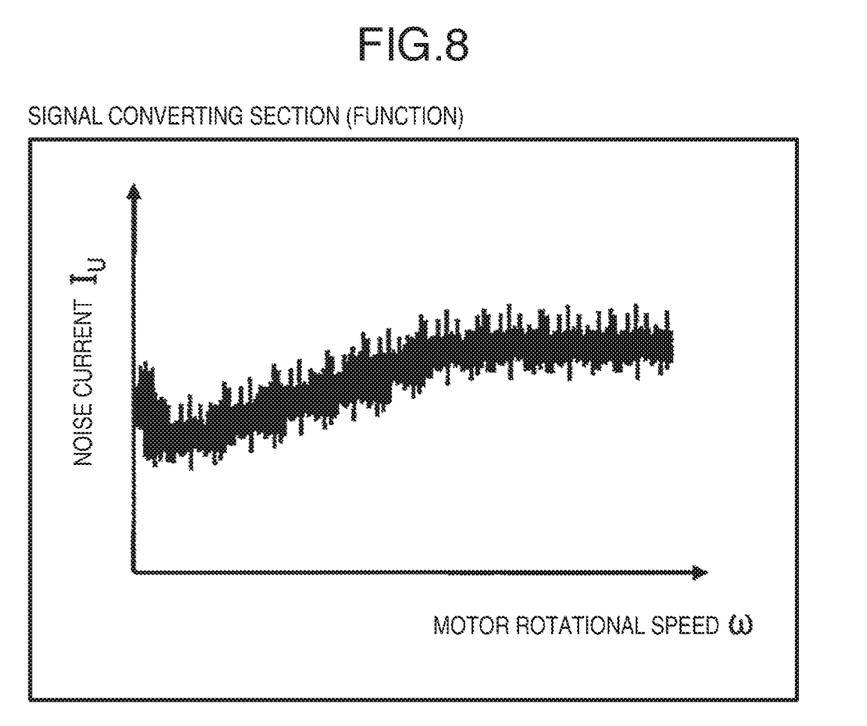
FIG. 8 is an example of signal conversion in the signal converting section in embodiment 1.

Further, when the inverter is used as an example, as shown in FIG. 7, the vehicle component circuit model 221 is expressed, for example, by current sources ($I_u$, $I_v$, $I_w$) respectively connected to the phases of the three-phase motor, and current sources (IPOS, INEG) connected to a battery. As shown in FIG. 8, each current is changed in time, for example, by the rotational speed ω of the motor. FIG. 8 shows the current $I_u$ of the U phase. In the signal converting section 210, the current I is provided as a function of the rotational speed ω, and the current I is outputted according to the rotational speed ω changing in time. The outputted current I is inputted into each of the current sources in FIG. 7, and the vehicle component circuit model 211 is driven by the inputted current.

Figure 9:
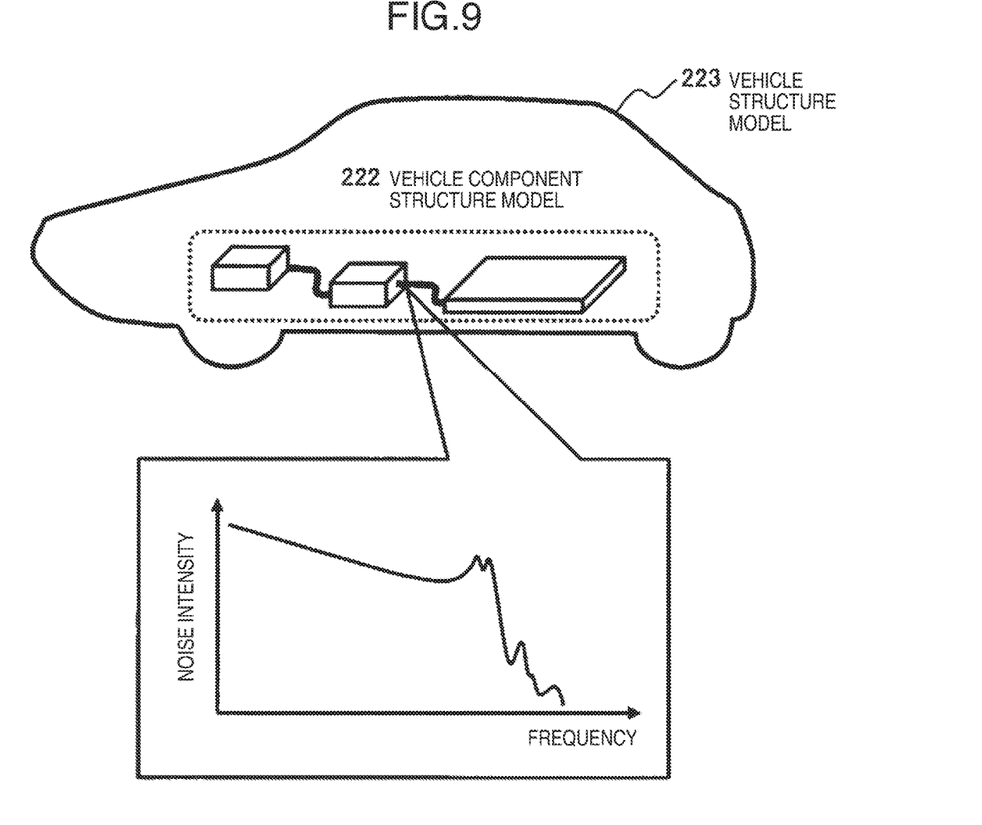
FIG. 9 is an example of a vehicles structure model in embodiment 1.

As shown in FIG. 9, the current/voltage 321 obtained by driving the vehicle component circuit model 221 become inputs for the analysis performed by using the vehicle component structure model 222 and the vehicle structure model 223. The vehicle component structure model 222 and the vehicle structure model 223 are driven by the current/voltage 321 inputted from the vehicle component circuit model 221 described above.

Figure 10:
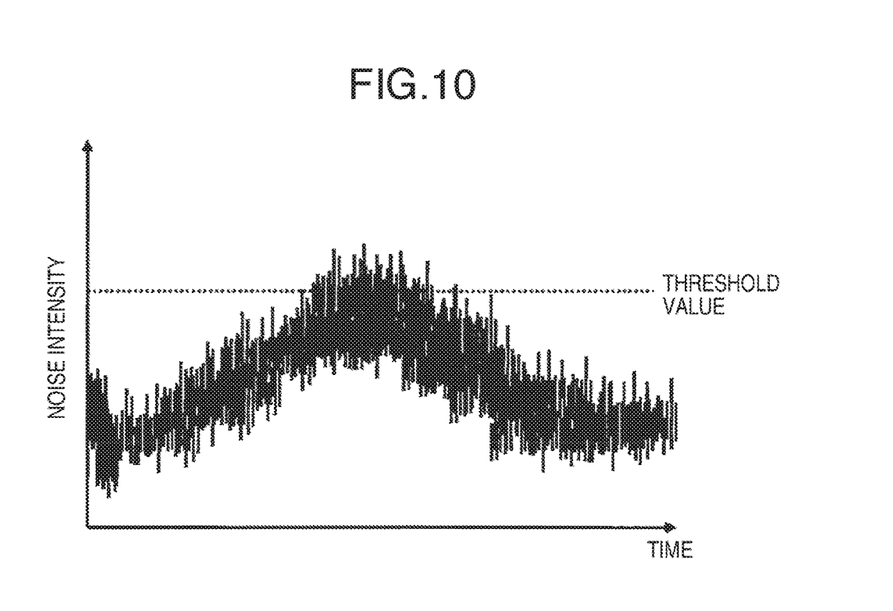
FIG. 10 is an example of processing in an analysis result determining, or judging, section in embodiment 1.
Figure 11:
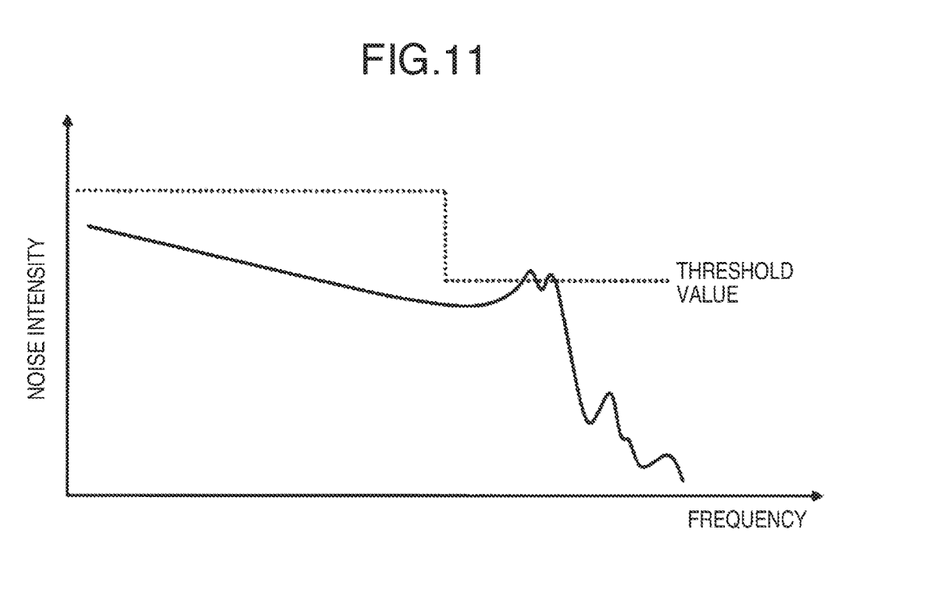
FIG. 11 is an example of processing in the analysis result determining section in embodiment 1.

The vehicle structure model is driven, and thereby, the calculated current/voltage/electromagnetic waves 330 are outputted to the analysis result determining section 230. For example, as shown in FIG. 10, in the analysis result determining section 230, the noise intensity is determined on the basis of a threshold value set for a time-based waveform of a certain specific frequency. Thereby, the timing at which the amount of electromagnetic noise exceeds the threshold value can be accurately grasped. Further, as shown in FIG. 11, whether or not the noise intensity at a certain time exceeds the threshold value may also be determined on the frequency axis. Thereby, an optimal threshold value can be set for each of the frequency components of electromagnetic noise, and thereby, measures for each of the frequency components can be performed.

Further, for example, the apparatus, such as the peripheral state grasping sensor 105 and the drive section sensor 103, in the vehicles may be expressed by the damage apparatus model 250 so that the electromagnetic noise influence on the apparatus is determined by the analysis result determining section 230. Thereby, the amount of electromagnetic noise can be calculated in consideration of the apparatus that is to be desirably least influenced by electromagnetic noise in particular.

Further, the irradiation model 240 may also be used, for example, on the assumption that the electromagnetic noise is irradiated toward the vehicle from the outside. Specifically, for example, the irradiation model 240 is a model configured by a current probe used for the specification testing of an antenna. For example, the probe has a physical shape and an equivalent circuit, and is maintained in the state where the energy determined by the standard or the like is applied to the apparatus by the probe. Thereby, even when, while the vehicle is running, the energy, such as electromagnetic waves, is irradiated to the vehicles or the damage apparatus from the outside, the level of influence by the irradiation can be determined, and thereby, the safety during the vehicle running can be further improved.

In addition to the controlling apparatus shown in FIG. 1, the configuration shown in FIG. 2 can be used as the electromagnetic noise analyzing apparatus, to perform only the electromagnetic noise analysis. The analysis is performed, as described above, by inputting the virtual driver operation information 301 and the actual running pattern. The electromagnetic noise analysis result can be obtained in accordance with the virtual driver operation information 301, and thereby, the analysis of cause of electromagnetic noise rise, the influence on the damage apparatus, and the irradiation tolerance can be performed.

Figure 12:
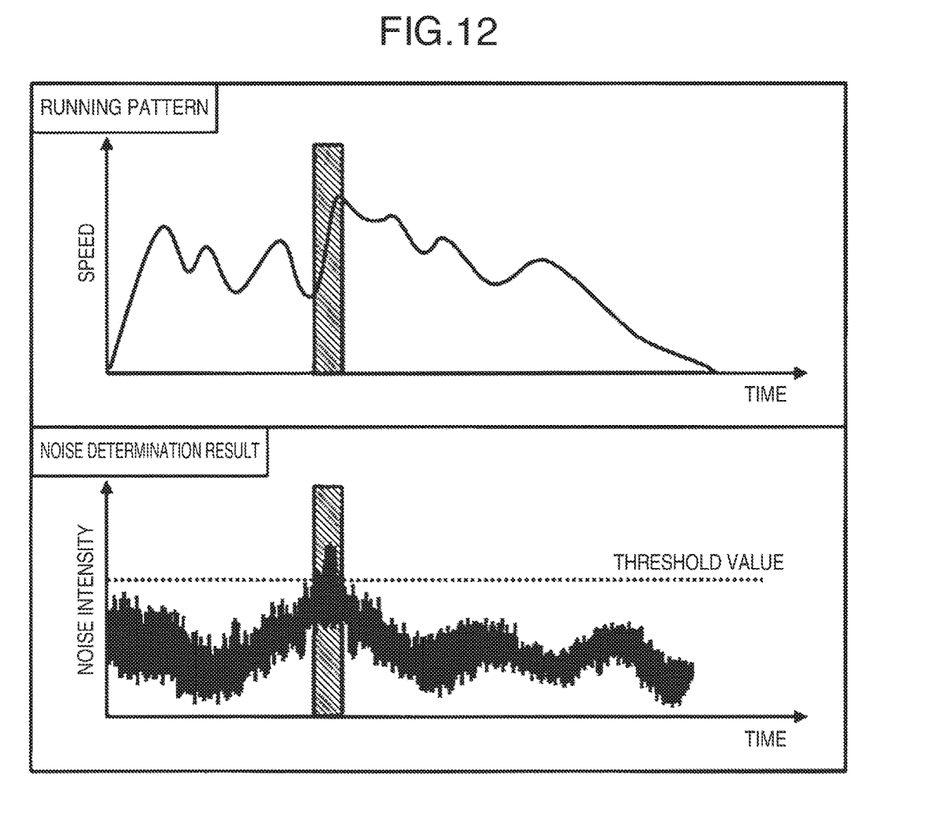
FIG. 12 is an example of a result display section in embodiment 1.

It should be noted that the information used in the electromagnetic noise analysis of the actual running pattern and operation information of the vehicle, the vehicle driving parameter, the noise parameter, the vehicle component circuit model, the vehicle component structure model, the vehicle structure model or the like, and the analysis result of the electromagnetic noise analysis and the like may be displayed on a display section (not shown) provided in the vehicle, the electromagnetic noise analyzing apparatus, or the controlling apparatus. Thereby, the driver can know the analysis result of electromagnetic noise in real time, and thereby, can easily grasp the timing at which the electromagnetic noise exceeding the threshold value is generated. In the display section, for example, the running pattern and the amount of noise may be simultaneously displayed in the form as shown in FIG. 12 so that, when the noise exceeds the threshold value, both of the running pattern and the noise analysis result are displayed, for example, with highlights. Thereby, it is possible to simply confirm the running pattern in which the electromagnetic noise is generated when the vehicle is running.

As described above, according to the present embodiment, when the drive control of vehicle running is performed on the basis of the driver operation information from the operation section, and the sensor signal of the peripheral state grasping sensor signal controlling section, the presence or absence of the influence of electromagnetic noise can be fed back to the drive control of vehicle running. Thereby, the drive control of vehicle running can be performed while reducing the influence of electromagnetic noise.

Embodiment 2

Figure 13:
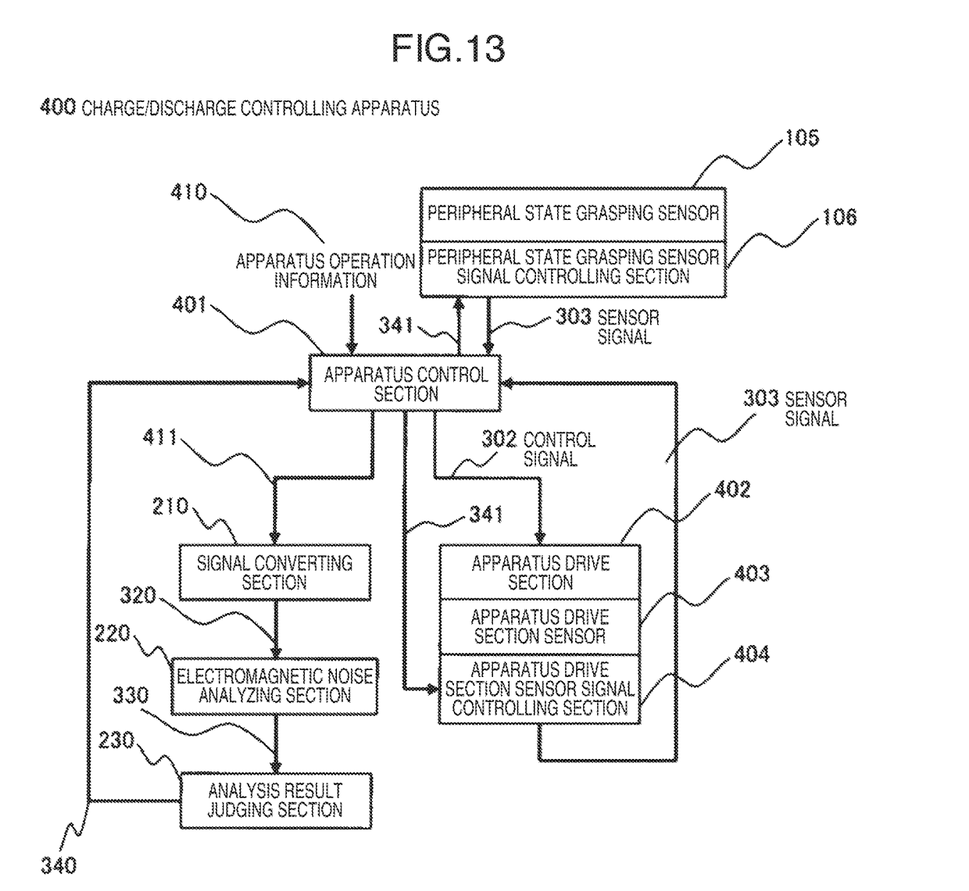
FIG. 13 is an example of a charge/discharge controlling apparatus in embodiment 2.

In the present embodiment, an example of a charge/discharge controlling apparatus, which controls not only the drive of a vehicle but also the drive of a power network of a home or a building, will be described with reference to FIG. 13 to FIG. 15. Especially, an example in the case of charging the vehicles by using the charge/discharge controlling apparatus will be described. It should be noted that the description of portions, which overlap with the portions of embodiment 1, will be omitted. FIG. 13 is an example of a configuration of a charge/discharge controlling apparatus of the present embodiment. It should be noted that, in FIG. 13, the driver operation information 301, the vehicle running control section 101, the running drive section 102, the drive section sensor 103, and the drive section sensor signal controlling section 104 in embodiment 1 shown in FIG. 1 are respectively replaced by an apparatus operation information 410, an apparatus control section 401, an apparatus drive section 402, an apparatus drive section sensor 403, and an apparatus drive section sensor signal controlling section 404. However, the technical idea in the present embodiment is the same as that in the embodiment 1.

A charge/discharge controlling apparatus 400 includes the apparatus control section 401, the apparatus drive section 402, the apparatus drive section sensor 403, the apparatus drive section sensor signal controlling section 404, the peripheral state grasping sensor 105, the peripheral state grasping sensor signal controlling section 106, the signal converting section 210, the electromagnetic noise analyzing section 220, and the analysis result determining section 230.

On the basis of the apparatus operation signal 501, the apparatus control section 401 outputs, as apparatus operation characteristic parameters 411, the control signal 302 for drive control of each of the apparatuses, and a charge/discharge rate and an apparatus operation signal which are physical quantities representing apparatus operation characteristics. In the signal converting section 210, the apparatus operation characteristic parameters 411 are converted from the physical parameters representing the apparatus characteristics into the noise parameters 320 that are electric parameters, such as voltage, current, frequency, impedance, and transfer function, which are related to electromagnetic noise.

The apparatus drive section 402 is driven by receiving the control signal 302 from the apparatus control section 401. The apparatus drive section 402 is, for example, a solar panel, an inverter or the like.

The apparatus drive section sensor 403 detects the driving state of the apparatus drive section 402. The driving state of the apparatus drive section 402 is, for example, the output voltage of the solar light, the current value of the inverter, or the like.

The apparatus drive section sensor signal controlling section 404 outputs, as a sensor signal, the driving state detected by the apparatus drive section sensor 403 to the apparatus control section 401.

Figure 14:
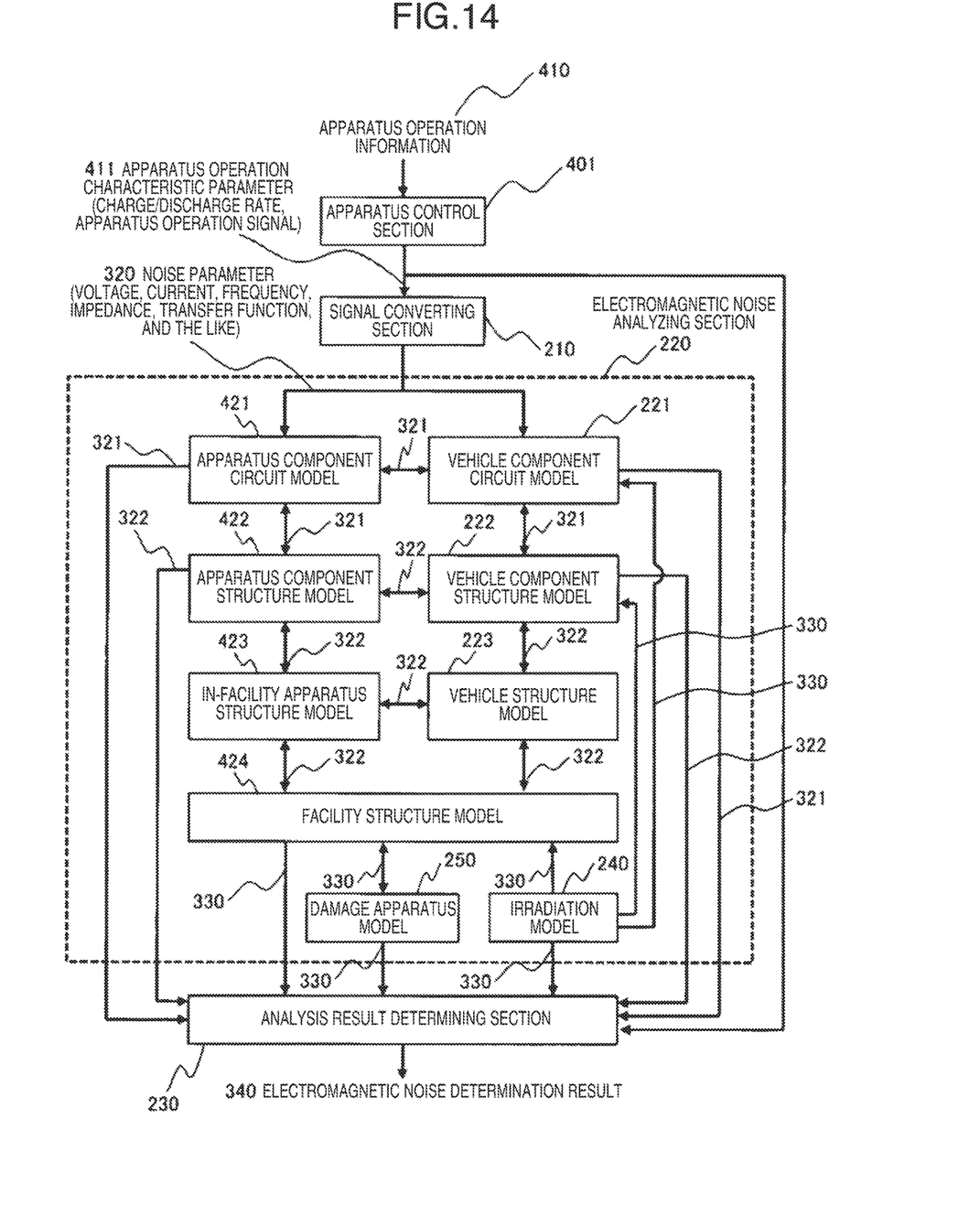
FIG. 14 is one example of a configuration of an electromagnetic noise analyzing section of the charge/discharge controlling apparatus in embodiment 2.

FIG. 14 is an example of a configuration of the electromagnetic noise analyzing section in embodiment 2.

An apparatus component circuit model 421 is, for example, a circuit model of a component, such as an inverter, of a solar power generator in the house. The apparatus component circuit model 421 has input/output ports which are the same as those of the vehicle component circuit model 221. Further, an apparatus component structure model 422 has input/output ports which are the same as those of the vehicle component structure model 222. Further, an in-facility apparatus structure model 423 has input/output ports which are the same as those of the vehicle structure model 223.

A facility structure model 424 is, for example, an electromagnetic field analyzing model representing the whole house provided with a vehicle power supply facility. The facility structure model 424 has input/output ports of current/voltage/electromagnetic wave 330, and performs information exchange via the input/output ports. For example, the input and output of information of each of the current/voltage/electromagnetic wave 330 are performed between the facility structure model 424 and each of the vehicle structure model 223, the in-facility apparatus structure model 423, the damage apparatus model 250, and the irradiation model 240. The current/voltage/electromagnetic wave 330 are outputted to the analysis result determining section 230.

The electromagnetic noise analyzing section 220 receives the noise parameter 320, and analyzes, for example, the amount of electromagnetic noise of the whole house, and outputs the analysis result of the amount of electromagnetic noise to the analysis result determining section 230. On the basis of a predetermined threshold value, the analysis result determining section 230 determines the analysis result of the amount of electromagnetic noise. When the analysis result of the amount of electromagnetic noise exceeds the threshold value, the analysis result determining section 230 outputs, to the apparatus operation control section 401, the electromagnetic noise determination result 340 and the apparatus operation characteristic parameter 411 in the house when the threshold value is exceeded.

In the apparatus operation control section 401, from the electromagnetic noise determination result 340 and the apparatus operation characteristic parameter 411 which causes a problem, the control signal 302 is changed to reduce the electromagnetic noise, and the apparatus drive section 402 is controlled. Thereby, the influence of electromagnetic noise is reduced, and the drive control of each of the apparatuses can be performed.

Further, the electromagnetic noise information 341 is outputted to the apparatus drive section sensor signal controlling section 404 and the peripheral state grasping sensor signal controlling section 106, and the communication method of the sensor signals 303 and 304 is changed. Further, in the drive section sensor signal controlling section 104 and the peripheral state grasping sensor signal controlling section 106, on the basis of the electromagnetic noise information 341, the electromagnetic noise may be subtracted from the sensor information of the drive section sensor 103 and the peripheral state grasping sensor 105, to reduce the noise influence. Thereby, even when the influence of electromagnetic noise becomes strong only for a certain period, the communication method is optimized, so that the stable communication can be performed.

Figure 15:
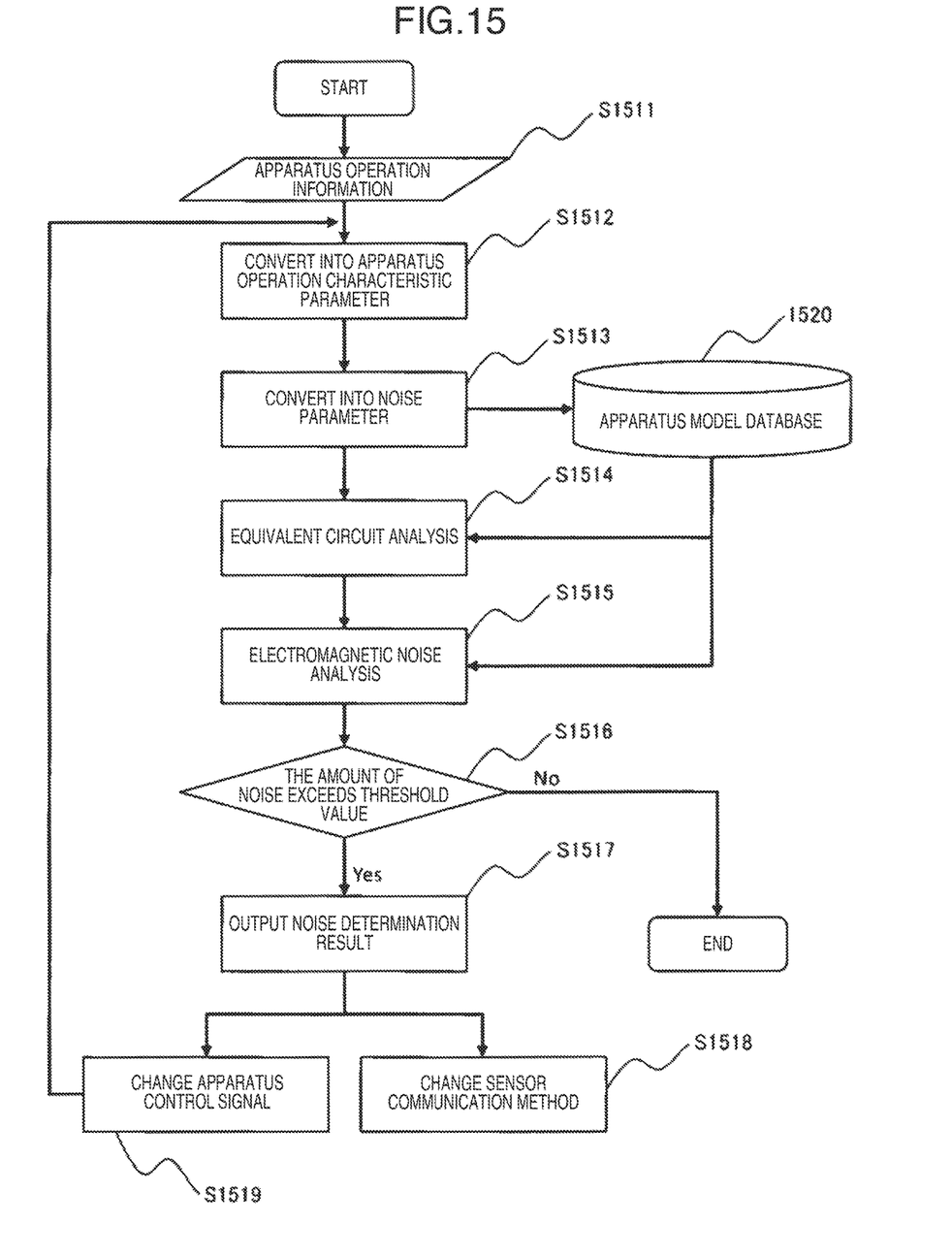
FIG. 15 is an example of a flowchart of the charge/discharge controlling apparatus in embodiment 2.

FIG. 15 is an example of a control flowchart of the charge/discharge controlling apparatus in embodiment 2. This control is started, for example, when the apparatus is in operation.

The apparatus operation information S1511 is converted into an apparatus operation characteristic parameter by the apparatus control section 401 (S1512), and then converted into a noise parameters by the signal converting section 210 (S1513). The noise parameter is inputted into the apparatus component circuit model 421 and the vehicle component circuit model 221 which are stored in an apparatus model database 1520, so that, on the basis of the parameter, the equivalent circuit model is driven, and the equivalent circuit analysis is performed (S1514). The current/voltage obtained by the equivalent circuit analysis are inputted into the apparatus component structure model 422, the vehicle component structure model 222, the in-facility apparatus structure model 423, the vehicle structure model 223, and the facility structure model 424 which are stored in the apparatus model database, and thereby, the electromagnetic noise analysis is performed (S1515). As a result of the electromagnetic noise analysis, when the amount of electromagnetic noise exceeds the predetermined threshold value (S1516), the noise determination result is outputted (S1517), and the apparatus control signal is changed (S1519), and also, the communication method of the sensors is changed (S1518). On the basis of the changed apparatus control signal, the electromagnetic noise analysis is again performed.

On the other hand, when the amount of electromagnetic noise does not exceed the threshold value, the flow of the control is ended. Then, when the apparatus is still in operation, the flow of the control is again started. It should be noted that, when the vehicle is in operation, on the basis of present driver operation information 1511 as it is, the flow of the control may be repeated without ending the control.

As described above, according to the present embodiment, the influence of electromagnetic noise not only from the vehicles but also from the charge/discharge controlling apparatus is detected, and the control is performed according to the influence of electromagnetic noise. Thereby, for example, even when the vehicle is charged, the influence of electromagnetic noise can be reduced. It should be noted that, needless to say, the effect of electromagnetic noise reduction can be obtained also when the charge/discharge facility is in operation in the state where the vehicle is not charged.

It should be noted that the present invention is not limited to the above-described embodiments and includes various modifications. For example, the above-described embodiments are described in detail in order to better illustrate the present invention, and the present invention is not necessarily limited to those provided with all the configurations described above. Further, a part of one of the embodiments described above can be replaced by a part of the configuration of the other embodiment, and also one of the embodiments described above can be additionally provided with a part of the configuration of the other embodiment. Further, it is possible to perform addition, deletion, and substitution of other configuration in a part of the composition of each of the embodiments.

Further, a part or all of the respective configurations, functions, processing sections, processing means and the like described above may be realized by hardware, for example, by designing using an integrated circuit. Further, the respective configurations, functions and the like described above may be realized by software in such a manner that processors interpret and execute programs for realizing the respective functions. Information, such as programs, tables, and files, for realizing the respective functions may be provided in a recording device, such as a memory, a hard disk, and an SSD (Solid State Drive), or in a recording medium, such as an IC card, an SD card, and a DVD.

Further, in the above-described configurations, the control lines and the information lines, which are considered to be necessary for explanation, are shown, and all of the control lines and the information lines necessary for realizing a product are not necessarily shown. In practice, almost all of the configurations may be considered to be connected to each other. It should be further understood by those skilled in the art that although the foregoing description has been made on embodiments of the invention, the invention is not limited thereto and various changes and modification may be made without departing from the spirit of the invention and the scope of the appended claims.

The invention claimed is:
1. A controlling apparatus comprising:
a vehicle controller configured to output, on the basis of operation information of a vehicle, a vehicle driving parameter indicating a driving state of the vehicle;
a signal converter configured to convert the vehicle driving parameter into an electric noise parameter;

an electromagnetic noise analyzer configured to calculate, on the basis of the noise parameter, an amount of electromagnetic noise propagating in the vehicle; and an analyzer configured to output the vehicle driving parameter and the amount of electromagnetic noise to the vehicle controller when the amount of electromagnetic noise calculated by the electromagnetic noise analyzer is not less than a predetermined threshold value, wherein the vehicle controller outputs a driving control signal for driving and controlling the vehicle on the basis of the vehicle driving parameter and the amount of electromagnetic noise outputted from the analyzer.

2. The controlling apparatus according to claim 1, further comprising:

a sensor which acquires operation information of the vehicle and communicates the operation information to the vehicle controller, wherein the sensor controls a frequency communicated on the basis of the driving control signal.

3. The controlling apparatus according to claim 1, wherein the electromagnetic noise analyzer calculates the amount of electromagnetic noise propagating in the vehicle, on the basis of the noise parameter, a vehicle component circuit model as an equivalent circuit of each of components of the vehicle, a vehicle component structure model as an analytic structure model of a component of the vehicle, and an vehicle structure model as an analytic structure model of the vehicle.

4. The controlling apparatus according to claim 3, wherein the electromagnetic noise analyzer further calculates the amount of electromagnetic noise propagating in the vehicle on the basis of a damage apparatus model as an analytic structure model of an apparatus in the vehicle affected by the influence of electromagnetic noise, and an irradiation model as an analytic structure model which irradiates electromagnetic noise.

5. The controlling apparatus according to claim 1, further comprising:

a display which displays the vehicle driving parameter or the noise parameter or the amount of electromagnetic noise.

6. A controlling method comprising:

outputting a vehicle driving parameter representing a driving state of a vehicle on the basis of operation information of the vehicle;

converting the vehicle driving parameter into an electric noise parameter;

calculating an amount of electromagnetic noise propagating in the vehicle on the basis of the noise parameter;

outputting the vehicle driving parameter and the amount of electromagnetic noise when the calculated amount of electromagnetic noise is not less than a predetermined threshold value; and outputting a driving control signal for driving and controlling the vehicle on the basis of the vehicle driving parameter and the amount of electromagnetic noise which are outputted.

7. The controlling method according to claim 6, wherein operation information of the vehicle is acquired, and the operation information is communicated by controlling the frequency on the basis of the driving control signal.

8. An electromagnetic noise analyzing apparatus comprising:

a vehicle controller configured to output, on the basis of an actual running pattern of a vehicle, a vehicle driving parameter representing a driving state of the vehicle;

a signal converter configured to convert the vehicle driving parameter into an electric noise parameter; and an electromagnetic noise analyzer configured to calculate an amount of electromagnetic noise propagating in the vehicle on the basis of the noise parameter; and an analyzer configured to output the vehicle driving parameter and the amount of electromagnetic noise to the vehicle controller when the amount of electromagnetic noise calculated by the electromagnetic noise analyzer is not less than a predetermined threshold value, wherein the vehicle is controlled on the basis of the vehicle driving parameter and the amount of electromagnetic noise outputted from the analyzer.

9. The electromagnetic noise analyzing apparatus according to claim 8, further comprising:

a display which displays an output from the vehicle controller or the signal converter or the analyzer.

10. The electromagnetic noise analyzing apparatus according to claim 8, wherein the electromagnetic noise analyzer calculates the amount of electromagnetic noise propagating in the vehicle, on the basis of the noise parameter, a vehicle component circuit model as an equivalent circuit of each of components of the vehicle, a vehicle component structure model as an analytic structure model of the components of the vehicle, and a vehicle structure model as an analytic structure model of the vehicle.

11. The electromagnetic noise analyzing apparatus according to claim 10, wherein the electromagnetic noise analyzer further calculates the amount of electromagnetic noise propagating in the vehicle, on the basis of a damage apparatus model as an analytic structure model of an apparatus affected by the influence of electromagnetic noise, and an irradiation model as an analytic structure model which irradiates electromagnetic noise.

12. The electromagnetic noise analyzing apparatus according to claim 11, wherein the electromagnetic noise analyzer further calculates the amount of electromagnetic noise propagating in the vehicle, on the basis of an apparatus component circuit model as an equivalent circuit of each apparatus of a facility for charging the vehicle, an apparatus component structure model as an analytic structure model of the each apparatus, and a facility structure model as an analytic structure model of the facility.

* * * * *